United States Patent
Carpentier et al.

(10) Patent No.: US 6,281,951 B1
(45) Date of Patent: Aug. 28, 2001

(54) DEVICE FOR CONVERGENCE CORRECTION IN A TELEVISION RECEIVER

(75) Inventors: Dirk Carpentier, Unterkirnach; Günter Gleim, Villingen-Schwenningen; Friedrich Heizmann, Villingen-Schwenningen; Bernd Rekla, Villingen-Schwenningen, all of (DE)

(73) Assignee: Deutsch Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/231,343

(22) Filed: Jan. 13, 1999

(30) Foreign Application Priority Data

Jan. 21, 1998 (DE) .............................................. 198 01 966

(51) Int. Cl.[7] ...................................................... H04N 9/28
(52) U.S. Cl. ........................................... 348/807; 348/745
(58) Field of Search .................................... 348/806, 807, 348/746, 745, 747; 315/367, 368.12; H04N 3/22, 3/23, 9/28

(56) References Cited

U.S. PATENT DOCUMENTS

| | | | |
|---|---|---|---|
| 4,754,204 | * | 6/1988 | Ando ..................................... 315/367 |
| 4,868,668 | * | 9/1989 | Tavernetti ............................. 348/745 |
| 5,298,985 | * | 3/1994 | Tsujihara ............................... 348/745 |

OTHER PUBLICATIONS

Ohsawa, Michitaka et al. A 46–in. high–resolution rear–projection display. In: Journal of the SID, 1/1, 1993, S. 23–26.
JP Patent Abstracts of Japan: 5–14913.
JP Patent Abstracts of Japan: 4–54091.
Copy od EPO Search rept.

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

The invention relates to a television receiver, in particular a projection television receiver having red, green and blue monochromatic picture tubes, the images of which are projected onto a picture screen. Each picture tube is assigned a correction device comprising a convergence circuit. The convergence circuit is assigned a memory in which correction values for the convergence correction of the three picture tubes are stored. In accordance with the correction values, the convergence circuit generates control signals, which are output to at least one correction coil where each correction coil has one driver circuit. A correction current is applied to the associated correction coil to correct image defects visible on each picture tube. The convergence circuit has control arrangement where the output signals coupled to the correction devices can be influenced in such a way that the same correction is always effected on the picture screen for a specific correction value, independently of the gain of the respective driver circuit. The invention also relates to a method for determining the control signal.

11 Claims, 3 Drawing Sheets

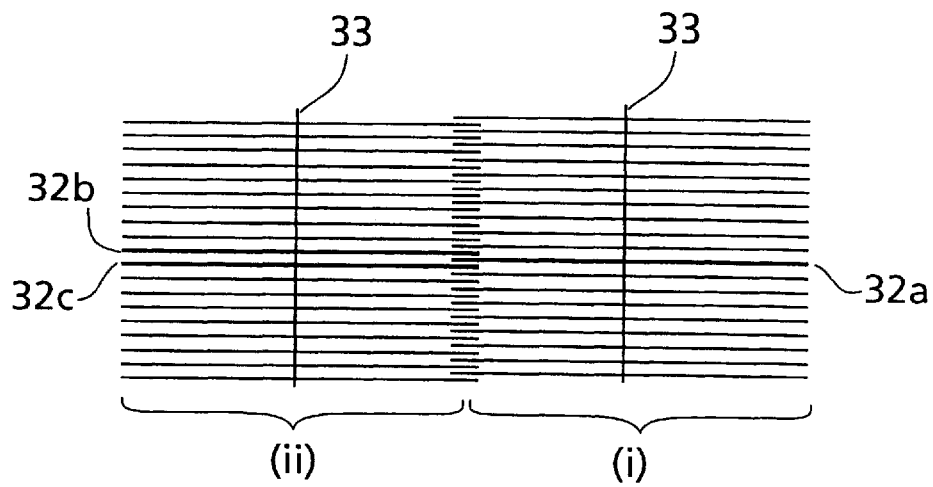
Fig.6a
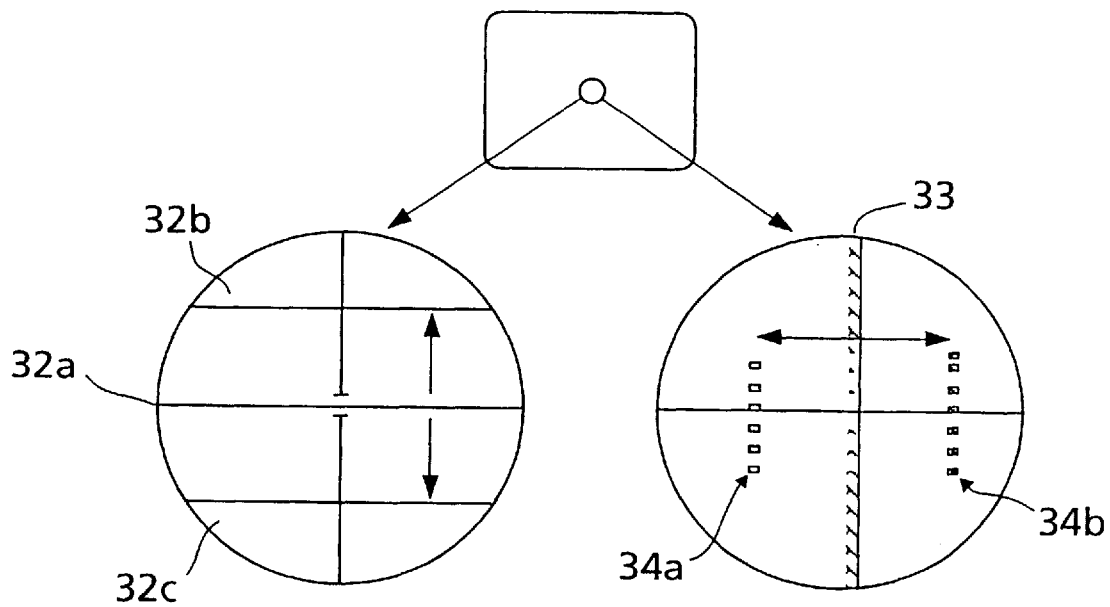
Fig.6b          Fig.6c

DEVICE FOR CONVERGENCE CORRECTION IN A TELEVISION RECEIVER

FIELD OF THE INVENTION

The invention relates to a colour television receiver and in particular to a device for convergence correction in a colour television receiver.

BACKGROUND OF THE INVENTION

Such a device serves fundamentally for the correction of parameters in the raster deflection, for example the correction of north/south and east/west distortions, of pin-cushion distortions, of nonlinearities in the deflection, and other geometric distortions in the horizontal or vertical directions. A particular field of application is convergence correction in a television projection receiver in which the pictures of three monochromatic picture tubes are projected onto a picture surface. The television receiver is understood as any receiver in which pictures are reproduced electronically or using a raster. The receiver can be fed from an arbitrary video signal source with a conventional television broadcast signal, or as a pure monitor with an RGB signal, an FBAS signal or, separately, with a luminance signal and a colour carrier.

The correction of the deflection parameters is undertaken with the aid of correction values which are stored in a convergence circuit. The correction values have been determined from a multiplicity of individual receivers from a specific series in such a way that the best correction is achieved on average. The correction values stored in the convergence circuit are converted in a digital-to-analogue converter into an analogue control signal and fed to a driver circuit consisting a pre-amplifier and an output amplifier. This driver circuit outputs a current, corresponding to the correction value, to a correction coil. The magnitude of the correction current also depends on the gain of the driver circuit, and can therefore vary from receiver to receiver. This is the reason why it has therefore been known in the prior art to design the basic amplification of the driver circuits such that the required deflection is ensured for the maximum correction value even in the case of the smallest value to be expected for the gain. However, this means at the same time that the full range of the correction values cannot be utilized at all in the case of a driver circuit with a large gain. The result of this is an unnecessary limitation of the resolution of the convergence correction.

SUMMARY OF THE INVENTION

It is the object of the invention starting from this point to create a colour television receiver in which it is possible to achieve an improved convergence setting.

The colour television receiver according to the invention has the advantage that a single digital data record of correction values in different colour television receivers always causes the same deflection for correcting the pictures independently of the gains of the driver circuits. A further advantage of the invention is that the maximum available resolution of the digital correction values can also be utilized in practice.

In an exemplary embodiment of the invention, the convergence circuit can comprise a digital-to-analogue converter which converts the stored correction values into an analogue control signal for at least one correction device. This exemplary embodiment permits a particularly expedient storage of the correction values n a digital storage medium, with the result that conventional memory chips can be used. At the same time, it is also possible to integrate the memory for the digital values with other required functions of the convergence circuit in a single semiconductor component.

In the said exemplary embodiment, the control means can advantageously be constructed such that the analogue control signal output to the driver circuit can be influenced. It is particularly advantageous when the control means comprise electronically adjustable resistors in order to influence the analogue control signal.

In accordance with a further exemplary embodiment of the invention, however, the control means can also be constructed such that the digital value fed to the digital-to-analogue converter can be influenced. It is expedient for this to be done by multiplying a digital matching factor by the stored correction value, and feeding the product obtained in this way to the digital-to-analogue converter as input value. The matching factor, and thus the product of the correction value and the matching factor, are selected such that the correction achieved on the picture screen by means of the correction values is independent, for a specific correction value, of the actual gain of the driver circuit.

In an exemplary embodiment of the invention, it is expediently possible to provide switching means by means of which the convergence circuit can be switched over optionally between two operating modes. One operating mode is active when a picture is represented on the picture screen, while the other operating mode is activated upon calibration of the convergence circuit. In the last-named operating mode, reference values stored in a memory can be processed in the convergence circuit.

One development of the invention can have means for generating a horizontal and/or a vertical structure on the picture screen, for example in the form of a continuous or broken line. This proves to be advantageous in the calibration of a convergence channel.

A second aspect of the invention relates to a method for setting the convergence in a television receiver.

In the method according to the invention, the first step is to determine the deflection of a cursor on the picture screen which is actually effected by a convergence channel. These actual data are then used to determine a control signal by means of which the convergence channel is calibrated to prescribed desired values. It is particularly advantageous when the deflection is determined by optical measurements.

BRIEF DESCRIPTION OF THE DRAWINGS

Exemplary embodiments of the invention are represented in the drawing, in which:

FIG. 6 shows an alternative method in accordance with the invention for determining the gain.

Identical or mutually corresponding elements of different exemplary embodiments of the invention are denoted by the same reference symbols in the description below.

DETAILED DESCRIPTION OF PREFERRED EMBODIMENTS

Figure 1:
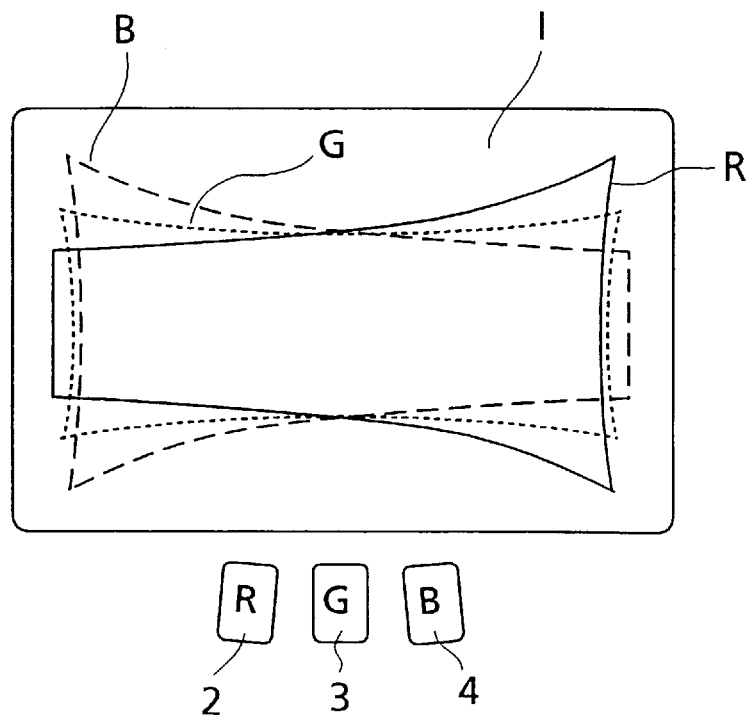
FIG. 1 shows a top view of the screen of a colour television receiver according to the invention, without convergence correction.

FIG. 1 shows a top view from the front of the picture screen 1 of a television receiver according to the invention, onto which the pictures of three monochromatic picture tubes 2, 3, 4 are projected. As is represented diagrammatically in the figure, the picture tubes 2 . . . 4 are arranged in geometrically differing ways. Consequently, image defects which are different for the individual picture tubes occur on the picture screen. These picture errors are corrected using supplementary correction coils which are mounted upstream of the actual deflection coils on the coil neck of the picture tubes. The correction is performed for each individual picture tube 2 . . . 4 both in the horizontal and in the vertical direction, that is to say a total of six correction coils with the associated driver circuits are present in the television receiver, being driven by a convergence circuit.

Figure 2:
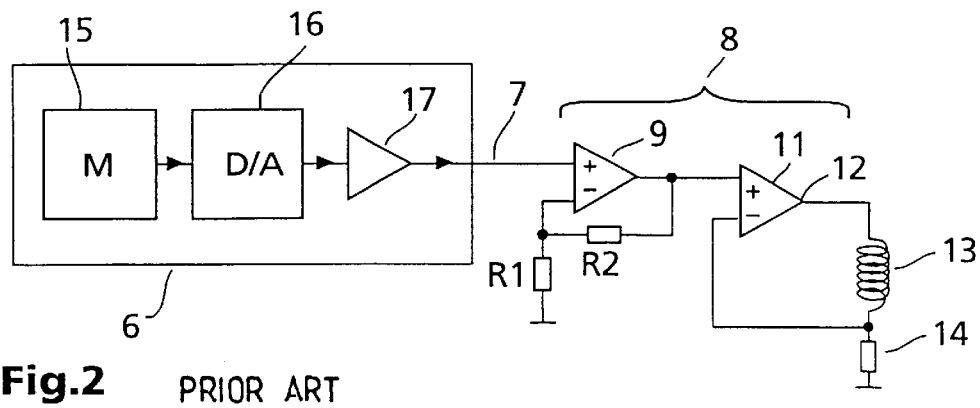
FIG. 2 shows a diagram of the convergence and correction device in a known television receiver.

A convergence channel such as is known in the prior art is represented diagrammatically in the block diagram of FIG. 2. A convergence circuit 6, which is constructed as an integrated circuit, is connected with an output 7 to a driver circuit 8 which comprises a pre-amplifier 9 and a main amplifier 11. The output 12 of the output amplifier 11 is connected to a correction coil 13 which influences the electron beam in the assigned picture tube. The correction coil 13 is connected in series to a load resistance 14. A convergence circuit 6 with the associated driver circuit 8 and correction coil 13 is denoted below in each case as a convergence channel. The further five convergence channels are of identical design.

The convergence correction is undertaken with the aid of stored digital convergence correction values. The convergence correction values are stored in a memory 15, denoted by M, in the convergence circuit 6, and are converted in a digital-to-analogue converter 16 into a corresponding analogue value. This analogue value is amplified by means of an amplifier 17, integrated in the convergence circuit 6, with a constant gain f1, and output at the output 7 to the driver circuit 8.

The details of how the convergence correction is carried out are not the subject-matter of the present invention. Methods and devices for convergence correction are known, for example, from the German Patent Applications DE 197 35 681 and DE 197 04 775.

The driver circuit 8 amplifies the analogue correction value, output by the convergence circuit 6, by means of a constant gain f2, and outputs a corresponding current to the correction coil 13. As a rule, the magnitude of the gain f2 varies from television receiver to television receiver because of component tolerances. The result is that an identical set of correction values leads in different television receivers to different image corrections.

Figure 3:
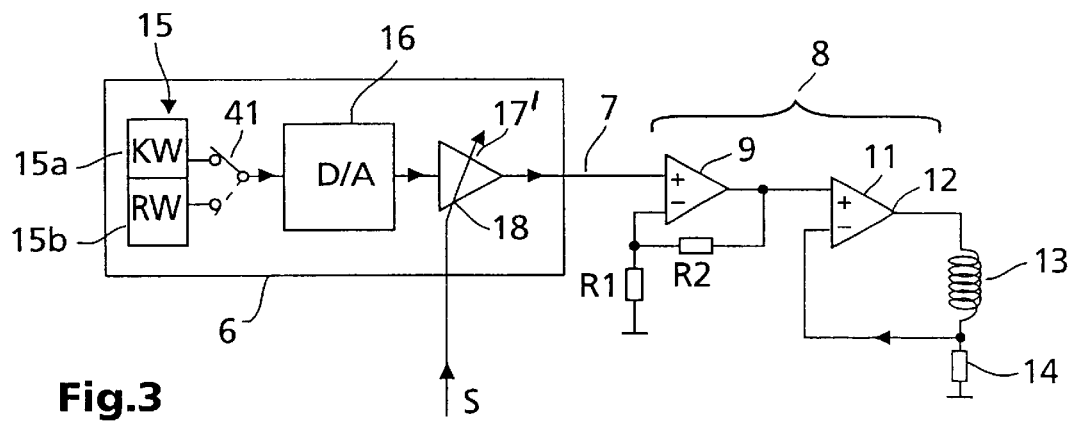
FIG. 3 shows a block diagram of the convergence and correction device in a television receiver according to the invention.

FIG. 3 shows a block diagram of a convergence channel such as is used in an exemplary embodiment of the invention. This circuit differs from that described above only in the design of the convergence circuit 6.

Here, the amplifier 17' integrated in the convergence circuit 6 is designed as an amplifier with a variable gain f1, by contrast with the known convergence circuit 6 represented in FIG. 2, in the case of which the gain f1 of the amplifier 17 is constant.

The amplifier 17' has a control input 18 into which there is input a control signal S which changes the gain f1 of the amplifier 17':f1=f1(S). The control signal S is generated by an external measuring device (not shown) . The way in which this is performed will be described further below.

The analogue value output by the digital-to-analogue converter 16 is thus always amplified by a factor f0 which is equal to the product of f1 and f2: f0=f1 ×f2. Thus, it is possible in the case of the circuit according to the invention to use a suitable setting of the control signal S so as always to achieve a constant total gain f0 independently of the component tolerances.

A further difference from the circuit represented in FIG. 2 is that the memory 15 is divided into a first and a second memory area 15a, 15b. The convergence values which are used for the convergence correction are stored in the first memory area 15a, while a television picture is represented on the screen 1. Specific reference values RW which serve to measure the total gain f0 of the respective convergence channel are stored in the second memory area 15b. The memory areas 15a, 15b can be addressed optionally by a switch 41, depending on which operating state of the circuit currently obtains. The operating state during which a picture is represented is denoted below as "display mode". The operating state during which the reference value is output is denoted below as "test mode".

Figure 4:
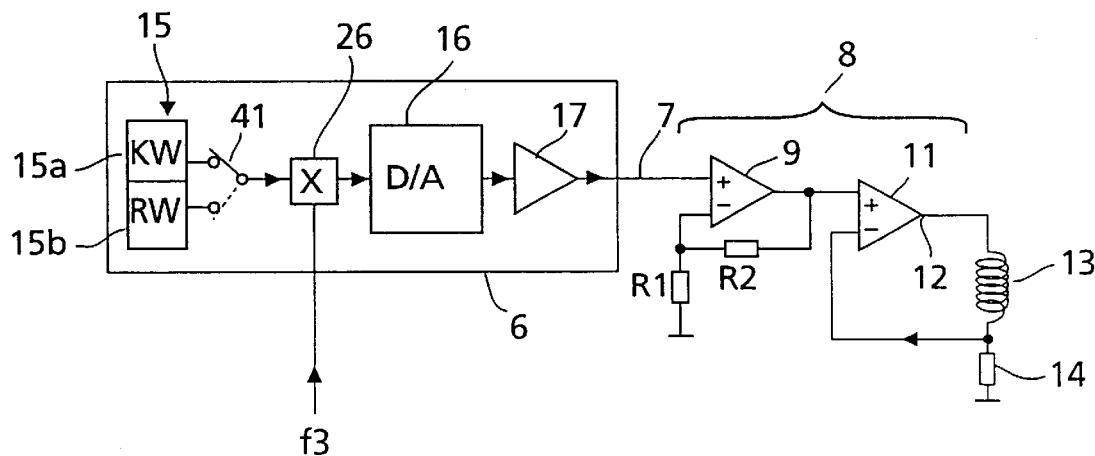
FIG. 4 shows a block diagram of a convergence and correction device of another embodiment of a television receiver according to the invention.

An alternative embodiment of the circuit represented in FIG. 3 is shown in FIG. 4. Instead of the amplifier 17' with a variable gain f1(S), in this embodiment an amplifier 17 which again has a constant gain f1 is integrated in the convergence circuit 6. However, by contrast with the circuits described so far provision is made of a multiplier stage 26 in which the convergence correction values KW read out of the memory 15a, or the reference values RW read out of the memory 15b are multiplied by a matching factor f3. The product of these two digital values is input into the input of the digital-to-analogue converter 16 and then processed further in the same way as in the circuit described in FIG. 2. In this way, in turn, the overall total gain achieved, f0=f1× f2×f3, has a predetermined constant value for all convergence channels—independently of component tolerances. Consequently, it is also possible with this embodiment for the same image correction always to be achieved on the picture screen using a single set of convergence correction values in different receivers. The function of the matching factor f3 corresponds to the function of the control signal S in FIG. 3. Therefore, in order to shorten the description, the term "control signal S" is also always to be understood below as the matching factor f3.

The multiplier stage 26 can also be integrated in the D/A converter 16 in a modified embodiment of the invention.

Figure 5:
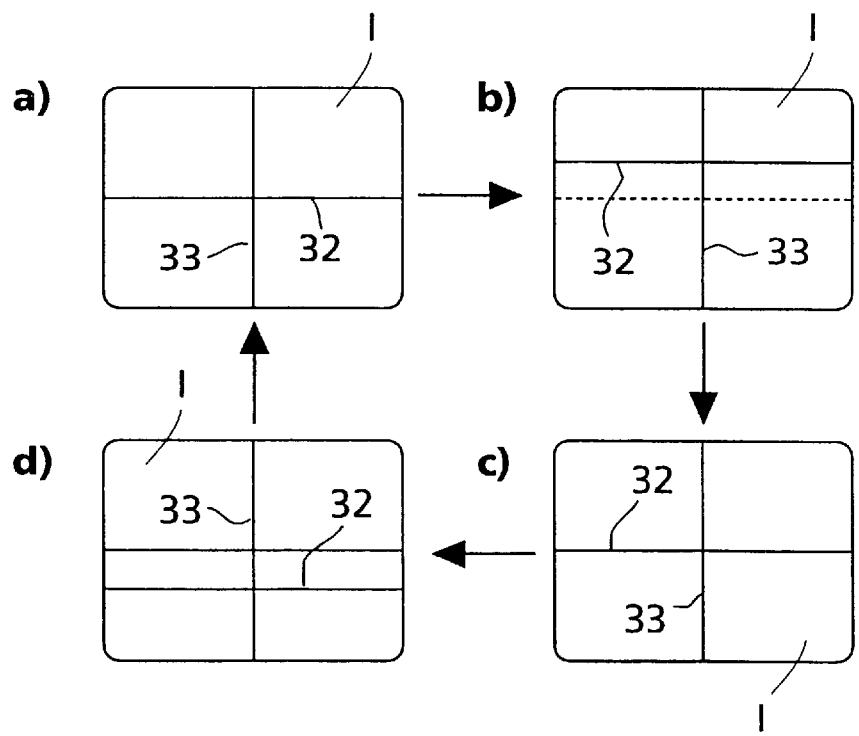
FIG. 5 shows the illustration of the method according to the invention for determining the gain.

FIG. 5 will now be used below to describe how the control signal is determined by means of the external measuring device in order to set the total gain f0 of all the convergence channels to a constant value:

The convergence device 6 is firstly switched into the "test mode" by the external measuring device. As a result, a horizontal bright line 32 (FIG. 5a) is generated by one of the picture tubes in the case of an uncorrected and dark picture. This bright line is denoted below as the gain cursor 32. The gain cursor 32 is preferably located in the middle of the picture screen since geometrical distortions are least there in the case of a television receiver with uncorrected convergence. In a first step, the absolute position of the vertical gain cursor 32 on the picture screen 1 is determined without any influencing by correction currents, for example using a high-resolution camera. In order to be able to centre the camera more easily on the picture screen 1, a vertical line 33 is represented in addition to the gain cursor 32. Subsequently, the gain cursor 32 is displaced by means of a defined digital reference value, which is read out from the memory area 15b, in the vertical direction, for example upwards on the picture screen 1. This position is determined, in turn, using the high-resolution camera (FIG. 5b). After the gain cursor 32 has returned to the position without being influenced in any way by correction currents (FIG. 5c), it is subsequently deflected in the opposite direction (FIG. 5d). The movements of the gain cursor are caused by corresponding reference values. In the process, the reference values assume values which can correspond to the largest or the smallest convergence correction value, and thus to the largest or smallest deflection of the image by means of the convergence coils.

The measuring device determines the control signal S from the difference between the position data, supplied by the camera, of the gain cursor as deflected upwards or downwards and the non-deflected cursor. The control signal S is determined in such a way that the measuring device changes the prescribed value in an iterative process until the position of the vertical gain cursor 32 displaced upwards or downwards corresponds to a predetermined position. The total gain f0 of the convergence channel is thus set to a prescribed value.

In order to avoid interference during position measurement due to line jitter of the gain cursor, the cursor is represented only in a field of the television picture. This problem does not arise if progressive scanning obtains with the receiver being investigated.

This process is now repeated for the same picture tube by means of a vertical bright line, which is denoted below as horizontal gain cursor. In an entirely similar way, the total gain for the horizontal convergence channel is standardized to a prescribed value. It is described in connection with FIG. 6c how the vertical line 33 is generated.

In order to carry out the convergence setting for the two other picture tubes, the two processes described above are repeated for the two other picture tubes.

All six convergence channels of the television receiver respectively being investigated are set overall to a specific and constant total gain f0. Since the non-deflected gain cursor serves as reference variable for the method described, the setting of the total gain remains uninfluenced, for example by deviations during the mechanical adjustment of the receiver.

In the case of television receivers in which the television picture is represented in two fields (interlaced mode), it is possible to use an alternative method of the invention, which is illustrated in FIGS. 6a to 6c.

According to this method, the vertical gain cursor 32a is firstly activated in a first field, for example the field with the odd lines, with the correction coil 13 dead (FIG. 6a (I)). In the subsequent field, the vertical gain cursor is formed from two successive horizontal lines 32b, 32c (FIG. 6a (ii)), which with the correction coil 13 dead are adjacent to the line which forms the gain cursor in the first field. The line 32b, which is located above the line 32a of the first field (FIGS. 6a (i), (ii)), is represented in a first step. Simultaneously, a current which displaces this line upwards is applied to the correction coil 13, as is illustrated in FIG. 6b. Thereafter, the line 32c, which is located below the gain cursor 32a of the first field (FIGS. 6a (i), (ii)), is represented. A current of the same magnitude is now sent in a reverse direction through the correction coil 13, and this causes the line 32c to be displaced downwards, as is shown once again in FIG. 6b. The calibration of the relevant convergence channel is performed in exactly the same way as has been described in connection with FIG. 5, by forming the difference between the deflected positions of the cursor lines 32b, 32c by comparison with the cursor line 32a.

For the purpose of calibrating the horizontal convergence channel, the direction of the current over a region of a plurality of lines around the centre of the picture is inverted from line to line in the correction coil 13. Only a point or short stroke is traced in the relevant lines, with the result that vertical lines, that is to say horizontal gain cursors 34a and 34b, are produced on both sides of the vertical centre line 33, as is represented in FIG. 6c. The total gain f0 of the convergence channel is set, in turn, to a specific value on the basis of position measurements of the cursor lines 33, 34a, 34b.

The two methods described are preferably carried out by the manufacturer during production of the television receiver. However, it is also possible for this method to be repeated when servicing the television receiver, in order to achieve as good a convergence setting as possible.

The measurements are preferably performed in the middle region of the picture screen 1, where convergence errors are least noticeable. This is important because the method described is carried out using an as yet uncorrected receiver. This method is carried out successively for each of the three monochromatic picture tubes.

During the measurement of the magnitude of the displacements, it is possible not only to correct the amplification of the convergence channels but also to check whether the amplifiers involved are operating asymmetrically. This has the advantage that in the case of a symmetrically operating amplifiers the receiver can still be improved before being supplied to the customer.

What is claimed is:

1. Television receiver having monochromatic picture tubes whose pictures can be projected onto a picture screen and each of which pictures has a correction device assigned to it, having a convergence circuit which comprises a memory in which correction values (KW) are stored and which outputs output signals to the correction devices, which respectively comprise at least one correction coil and a driver circuit for each correction coil, the correction devices being suitable for correcting image defects of the respectively assigned picture tubes on the picture screen by virtue of the fact that the driver circuits output correction currents to the associated correction coils, characterized in that the convergence circuit has control means by means of which the output signals output to the correction devices can be influenced in such a way that the same correction is always effected on the picture screen for a specific correction value, independently of the gain of the respective driver circuits.

2. Colour television receiver according to claim 1, characterized in that the convergence circuit comprises at least one digital-to-analogue converter which converts a stored digital correction value into an analogue signal.

3. Colour television receiver according to claim 2, characterized in that the control means assigned to the convergence circuit are constructed such that the analogue signal output by the digital-to-analogue converter can be influenced.

4. Colour television receiver according to claim 3, wherein the control means comprise a multiplier stage which multiplies the stored correction value by a digital matching factor and outputs a resultant digital product value to the digital-to-analogue converter.

5. Colour television receiver according to claim 1, characterized in that the control means assigned to the convergence circuit are constructed such that the output signal output to the correction device can be influenced.

6. Colour television receiver according to claim 1, characterized in that the control means comprise electronically adjustable resistors.

7. Colour television receiver according to claim 1, characterized in that switching means are provided by means of which the convergence circuit can be switched over optionally between two operating modes.

8. Colour television receiver according to claim 1, characterized in that at least one reference value (RW) is also stored in the memory.

9. Colour television receiver according to claim 1, characterized in that the convergence circuit has means for generating a horizontal and/or a vertical structure on the picture screen.

10. Colour television receiver according to claim 9, wherein the structure which can be represented on the picture screen can be moved on the picture screen in the horizontal or vertical direction by means of the a convergence circuit and a connection device.

11. A method for standardizing convergence correction in a colour television receiver, the method comprising the following steps:

a) determining a deflection magnitude on a picture screen by a convergence channel with a predetermined input value applied to a convergence circuit of said convergence channel, b) determining a control signal value which influences said convergence channel in such a way that the deflection magnitude determined in step a) corresponds to a prescribed desired magnitude, and c) repeating the steps a) and b) for each convergence channel in each colour.

* * * * *